United States Patent
Courvoisier et al.

(10) Patent No.: US 11,547,529 B2
(45) Date of Patent: Jan. 10, 2023

(54) ANNULAR RESILIENT RETENTION MEMBER

(71) Applicant: STRAUMANN HOLDING AG, Basel (CH)

(72) Inventors: Stéphane Courvoisier, Colombier (CH); Florian Dalla Torre, Liestal (CH)

(73) Assignee: STRAUMANN HOLDING AG, Basel (CH)

( * ) Notice: Subject to any disclaimer, the term of this patent is extended or adjusted under 35 U.S.C. 154(b) by 323 days.

(21) Appl. No.: 14/760,393

(22) PCT Filed: Jan. 8, 2014

(86) PCT No.: PCT/EP2014/000016
§ 371 (c)(1),
(2) Date: Jul. 10, 2015

(87) PCT Pub. No.: WO2014/108327
PCT Pub. Date: Jul. 17, 2014

(65) Prior Publication Data
US 2015/0351867 A1   Dec. 10, 2015

(30) Foreign Application Priority Data
Jan. 10, 2013  (EP) .................................... 13000120

(51) Int. Cl.
*A61C 1/14* (2006.01)
*A61C 8/00* (2006.01)

(52) U.S. Cl.
CPC .............. *A61C 1/14* (2013.01); *A61C 8/0089* (2013.01)

(58) Field of Classification Search
CPC ........... A61C 1/14; A61C 1/084; A61C 1/147; A61C 1/18; A61C 1/186; A61C 1/188;
(Continued)

(56) References Cited

U.S. PATENT DOCUMENTS 3,866,957 A * 2/1975 Norton .................... F16L 37/23
                                                      285/316
4,534,734 A * 8/1985 Lares ....................... A61C 1/18
                                                      433/126
(Continued)

FOREIGN PATENT DOCUMENTS

| EP | 1537834 A1 | 6/2005 | |
|---|---|---|---|
| EP | 2471485 A1 * | 7/2012 | ........... A61C 8/0089 |
| WO | 2004/034919 A1 | 4/2004 | |

OTHER PUBLICATIONS

Jul. 14, 2015 International Preliminary Report on Patentability issued in International Patent Application No. PCT/EP2014/000016.
(Continued)

*Primary Examiner* — Cris L. Rodriguez
*Assistant Examiner* — Drew S Folgmann
(74) *Attorney, Agent, or Firm* — Oliff PLC

(57) ABSTRACT

A dental tool, such as an insertion tool for a dental implant, including a shaft extending along a longitudinal axis and having a distal end and a proximal end, the tool further including an annular resilient retention member formed of a metal material and connected to the shaft such that at least a section of the member protrudes from a surface of the shaft.

20 Claims, 9 Drawing Sheets

(58) Field of Classification Search
CPC ............ A61C 8/0089; A61C 8/006; A61C 8/005–0074; F16B 13/0875; F16B 21/18
USPC .......... 433/165, 75, 172–176; 285/267–269, 285/279; 403/109.3, 136, 166, 220–229, 403/326–330
See application file for complete search history.

(56) References Cited

U.S. PATENT DOCUMENTS

| | | | | |
|---|---|---|---|---|
| 5,237,893 A * | 8/1993 | Ryder | ............ | B25B 23/108 |
| | | | | 81/436 |
| 5,944,525 A * | 8/1999 | Ura | ............ | A61C 8/0089 |
| | | | | 433/173 |
| 6,086,371 A * | 7/2000 | Bassett | ............ | A61C 8/0087 |
| | | | | 206/339 |
| 6,217,332 B1 * | 4/2001 | Kumar | ............ | A61C 8/0087 |
| | | | | 206/368 |
| 6,416,324 B1 * | 7/2002 | Day | ............ | A61C 8/008 |
| | | | | 433/173 |
| 7,131,840 B2 | 11/2006 | Constantino | | |
| 7,887,325 B2 * | 2/2011 | Whipple | ............ | A61C 8/0089 |
| | | | | 433/163 |
| 8,042,684 B2 * | 10/2011 | Guenter | ............ | A61C 8/0087 |
| | | | | 206/63.5 |
| 2006/0063130 A1 * | 3/2006 | Hayman | ............ | A61C 1/07 |
| | | | | 433/141 |
| 2006/0269890 A1 * | 11/2006 | Mundwiler | ............ | A61C 8/0087 |
| | | | | 433/13 |
| 2007/0072148 A1 * | 3/2007 | Memmolo | ............ | A61C 8/0087 |
| | | | | 433/141 |
| 2007/0105067 A1 * | 5/2007 | Hayashi | ............ | A61C 8/0048 |
| | | | | 433/172 |
| 2008/0102420 A1 * | 5/2008 | Porter et al. | ............ | A61C 8/0001 |
| | | | | 433/152 |
| 2009/0123889 A1 * | 5/2009 | Mehrhof | ............ | A61C 8/00 |
| | | | | 433/173 |
| 2010/0285426 A1 * | 11/2010 | Nardi | ............ | A61C 8/0001 |
| | | | | 433/173 |
| 2011/0143315 A1 * | 6/2011 | Guenter | ............ | A61C 8/0089 |
| | | | | 433/147 |
| 2012/0315599 A1 * | 12/2012 | Mullaly | ............ | A61C 8/0048 |
| | | | | 433/173 |
| 2013/0230825 A1 * | 9/2013 | Kenk | ............ | A61C 8/0087 |
| | | | | 433/163 |
| 2014/0099602 A1 * | 4/2014 | Courvoisier | ............ | A61C 8/0089 |
| | | | | 433/173 |

OTHER PUBLICATIONS

Jun. 3, 2014 International Search Report issued in International Patent Application No. PCT/EP2014/000016.

* cited by examiner

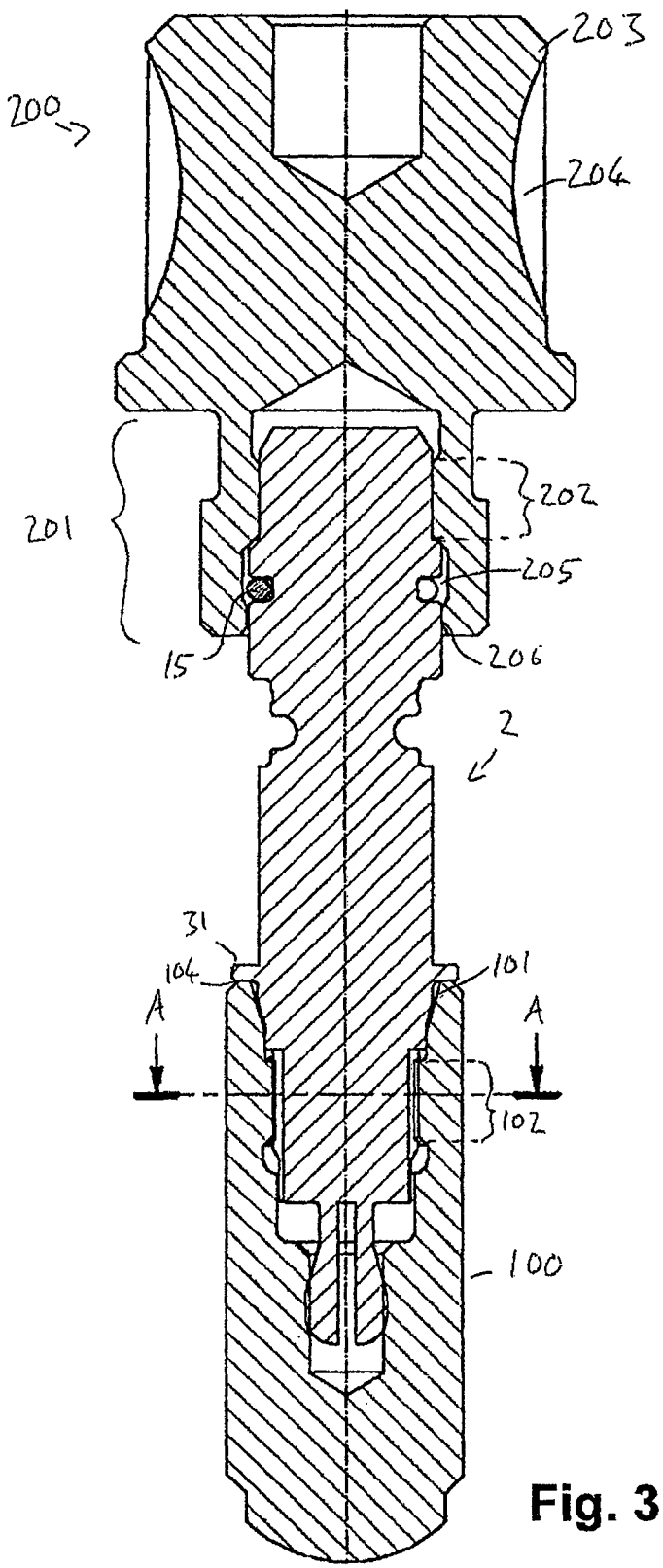
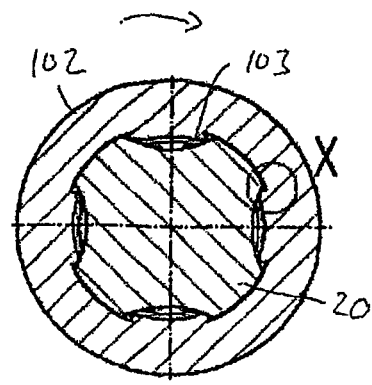
Fig. 4
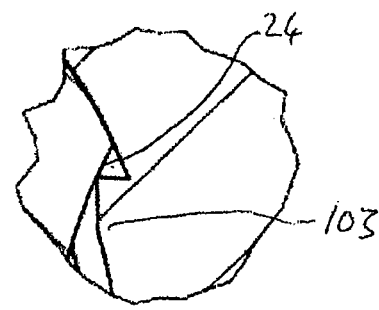
Fig. 5
Fig. 3

ANNULAR RESILIENT RETENTION MEMBER

Dental implants are used to replace individual teeth or for anchoring more complex structures, which generally replace several or even all of the teeth.

In order to place a dental implant within the mouth of a patient, a suitable cavity must be created within the patient's jawbone. This is usually achieved by drilling a series of coaxial holes within the bone of gradually increasing diameter, which prevents excessive heat generation. Once the hole is prepared and, where necessary, tapped, the implant is inserted.

This is typically done with the aid of an insertion tool or transfer piece, which securely holds the implant while this is transported to the implant site and then inserted, for example by screwing, into the bone.

All dental tools used in the creation of the implant site and placement of the implant typically comprise a shaft extending along a longitudinal axis and having a distal and a proximal end. In the context of this specification, the distal end of the tool is that which, during use, is closest to the implant site. The distal end region of the tool thus comprises a functional element, which enables the tool to carry out its primary function, e.g. drilling, tapping, retention of an implant etc. The proximal end in contrast refers to the opposing end of the tool shaft, which in use is furthest from the implant site. The proximal end region typically comprises a connection means for connection to a manipulating device, such as a dental handpiece, although it could alternatively be arranged for direct manipulation by the user. When present, the connection means must enable the tool to be axially held by the manipulating device, and in most cases also held in a non-rotational manner such that torque can be transmitted to the tool. One example of a connection means is a standard iso-latch, as shown for example in U.S. Pat. No. 7,131,840.

It is also known to provide a connection means comprising an O-ring or C-ring, this ring being formed of an elastomeric material such that it is resiliently deformable. The cooperating manipulating device comprises, at its distal end, a hollow sleeve comprising an annular groove on its internal surface. The elastomeric ring is sized such that it has a greater external diameter than the internal diameter of the sleeve of the drive tool, so that the ring is compressed as it is pushed into the sleeve and then expands into the groove. This creates a snap-fit between the two instruments, providing the user with feedback when the tool has been correctly inserted and resisting axial displacement of the tool relative to the manipulating device. It is also possible for the o- or C-ring to form a press-fit with the internal surface of the sleeve, in which case no groove is necessary.

Such elastomeric ring connections are well known in the art. Suitable materials for such rings include silicon and PEEK. The material chosen must be biocompatible, provide the desired retention force and fulfil any other requirements particular to the specific tool in question. For example, sterile items that are stored in saline solution often comprise PEEK rings, as these are stable in such environments.

As well as using such rings as the connection means at the proximal end of various dental tools, in order to connect the tool to a manipulating device, it is also known to use elastomeric rings to provide an axial connection to the implant, i.e., to provide such rings at the distal end of dental implant insertion tools.

These rings function in an identical manner to those used in the connection means of various tools, i.e. they are sized to compress upon insertion into an internal bore of the implant. Depending on the design of the implant the rings may then expand into a groove or undercut within the implant bore in order to form a snap fit, or they may simply form a press fit with the internal bore.

WO2004/034919, U.S. Pat. No. 7,131,840, US 2008/0102420 and EP1537834 all disclose tools which comprise an elastomeric ring within their distal end region for axial attachment to an internal bore of the implant.

Despite the many benefits of such rings, several disadvantages exist, particularly with regard to PEEK rings. These are manufactured by injection moulding, which is time consuming, expensive and requires a new mould to be created whenever an adjustment to the ring shape is required. Furthermore, inconsistences in the moulding process mean that the shape of the produced rings is not consistent, leading to a high tolerance range and, consequently, variation in retention forces.

More generally, as the elastomeric rings are made from a different material to the main body of the tool this can lead to negative chemical reactions. The soft material used in the rings can also result in abrasion, leading to a reduced retention force over time or the shedding of material into the mouth of the patient.

It is therefore an aim of at least a preferred embodiment of the present invention to provide an improved retention ring which is cheap and easy to manufacture and for which the chances of chemical interactions and/or material abrasion are reduced, while maintaining the elastic tactile sensation when mounting or releasing a part from it.

In accordance with one aspect of the present invention therefore, there is provided a dental tool comprising a shaft extending along a longitudinal axis and having a distal end and a proximal end, the tool further comprising an annular resilient retention member formed of a metal material and connected to said shaft such that at least a section of the member protrudes from a surface of said shaft.

Such annular resilient retention members are simple and quick to manufacture. A wire or sheet of suitable diameter can be simply cut and bent into shape. This process is easy to adapt and therefore changes in the shape of the annular member are simple to implement. In addition the consistency of the metal annular members produced is higher than with injection moulded components and hence the tolerance range of the retention force is reduced, thus making the connection more standardised.

The strength and flexibility of the metal retention member can be altered after production via methods such as stress relief annealing at elevated temperatures. Thus, the same basic annular shape can be used to provide different retention forces. The colour of the member can also be altered by anodising techniques, which is a cheaper means of altering colour than those necessary with elastomeric components, which must be manufactured with a particular coloured dye.

As metallic materials are harder than elastomers these are less likely to suffer from abrasion.

The annular retention member can be formed of any biocompatible metal material capable of elastic deformation, e.g. steel, stainless steel, tantalum, Co—Cr alloys. Preferably however the member is formed from titanium or a titanium alloy, e.g. TAN (Ti-6Al-7Nb) or TAV (Ti-6Al-4V). The degree of biocompatibility necessary will depend to some extent on the location of the member on the tool and also the function of the tool. Annular members located in the distal end region of tools which are brought into direct contact with bodily tissue and fluids will need to have a higher degree of biocompatibility than those located at the proximal end of a tool which in use is remote from the patient. Titanium and its alloys have a high degree of biocompatibility, which makes them a preferred choice for the resilient annular member regardless of its position on the tool.

Preferably the annular resilient retention member is formed of the same material as the dental tool shaft at the location at which the member is connected. For example, when the shaft is made from TAN the member is also preferably formed from TAN. When the shaft is made from steel the member is preferably also made of steel etc. This matching of the annular member and shaft material prevents the possibility of negative chemical reactions, and reduces the likelihood of abrasion of the member. In most situations the shaft will be an integral component formed of a single material, and thus in such instances it is preferred that the annular member is formed of the same material as the shaft.

The annular resilient retention member of the present invention is a hollow ring-like member that can be connected to an internal or external surface of the shaft such that it at least partially extends around the circumference of the shaft. As at least a section of the member protrudes from the surface of the shaft, this can be used to form a snap or press fit engagement with a cooperating component, such as a manipulating device or dental implant.

In one embodiment the annular member may be integral with the shaft. In such embodiments the member extends from the surface of the shaft and curves about the circumference of the shaft, either at a fixed distance or at a gradually increasing distance, so as to form a circular or spiral strip of metal about the shaft. This strip can extend from an external surface or internal surface depending on the configuration of the device to which it is intended to connect the dental tool. This will be discussed further below in relation to other embodiments.

Preferably however the annular member is non-integral with the shaft. In other words the member is a discrete component manufactured separately from the shaft which is later connected to this. This increases the ease of manufacture and adaptability of the member. The annular metal member is preferably a hollow band, such as a ring or sleeve.

Preferably the band is discontinuous, for example a C-ring. This increases the flexibility of the band in the radial direction, which in turn increases the retention force provided as well as easing attachment to the shaft.

In such embodiments the band of the present invention can be formed from a cylindrical wire or sheet of metal, the longitudinal axis of which is bent about a central axis such that the opposing ends of the wire or sheet face or contact one another.

When the band is discontinuous it does not need to extend 360° about the central axis and instead can comprise a circumferential gap. The gap preferably extends over an angle of at least 75° and no greater than 180°, preferably over an angle of greater than 80° and most preferably an angle of between 85 and 100°. This provides a suitable degree of flexibility while still enabling the band to be securely fastened to the tool shaft.

The band may take the shape of standard existing elastomeric rings, which are typically circular in cross-section, i.e. in a plane perpendicular to the longitudinal axis of the ring, and follow a circular path, i.e. the ring has a uniform radius about its central axis, which generally coincides with the longitudinal axis of the dental tool. Other cross-sectional shapes are possible, for example oval, polygonal etc.

In preferred embodiments however the resilient band has at least one protrusion on its outer surface, i.e. the surface which faces away from the tool shaft. This protrusion thus increases the outer radius or decreases the inner radius of a portion of the band, depending on whether the band is connected to the external or internal surface of the shaft, increasing the extent to which the band protrudes from the shaft surface and thus increases the retention force obtainable. In some embodiments only the one or more protrusion of the band will protrude from the surface of the shaft.

In some embodiments the band comprises a metal sleeve which at least partially encircles the inner or outer surface of the tool shaft over a length of the shaft. The sleeve can be discontinuous and either comprise a gap as discussed above or be wrapped around the shaft such that the opposing ends of the sleeve contact one another. Typically the sleeve is formed by a sheet of metal which is bent around a central axis.

When the resilient annular member comprises a sleeve this can preferably comprise a protrusion extending around the circumference of the sleeve such that the radius of the sleeve in one longitudinal location differs from the remaining areas of the sleeve. It is then the circumferential protrusion which in use engages the groove or undercut of the co-operating component (e.g. a manipulating tool or implant) to form a snap fit, or the smooth surface of the co-operating component to form a press fit. In other embodiments the protrusion may not extend fully about the circumference of the sleeve but instead only over a limited angular extent. The sleeve may then comprise a plurality of angularly spaced protrusions. Alternatively the sleeve may comprise flaps which are bent away from the surface of the tool to provide protrusions.

Most preferably however the band comprises at least one kink. In other words the band is not curved uniformly about the central axis but instead comprises at least one section which is bent about a second axis parallel to but remote from the central axis. Thus the kink forms a protrusion which extends along the longitudinal length of the band. The kink acts as a lever arm, increasing the resilience of the band and hence increasing its retentive force. When the band is connected to the external surface of the tool shaft it is preferable that the second axis about which the kink is bent lies within the circumference of the band. Additionally or alternatively it is preferable that the at least one kink has a smaller radius of curvature than the remainder of the band.

In the most preferred embodiments of the present invention the band comprises a resilient ring. In the context of the present invention a ring is distinguished from a sleeve in that the longitudinal length of the ring, as measured parallel to the longitudinal axis of the tool shaft, is no more than twice the cross-sectional diameter of the ring. Metal rings are typically formed by a cylinder of wire which is bent around a central axis.

In a preferred embodiment one or more protrusion is created on the outer surface of the ring. In this way at least one section of the ring extends a greater distance from the surface of the shaft than the remainder of the ring. As discussed above this increases the retention force applied by the ring in use. Preferably the ring comprises at least one kink, as described above.

In some embodiments it is preferable for the band to comprise a single kink whereas in others the band can comprise a plurality of kinks, for example two, three, four, five or six. A single kink gives a single point of contact between the band and the cooperating device, which eases manufacturing tolerances. The preferred number of kinks will depend to some extent on the shape of the device with which the dental tool is intended to cooperate, as will be discussed further below.

When the band comprises a plurality of kinks these can be evenly spaced about the circumference of the band and be uniform in shape. In such embodiments the plurality of kinks can result in the band adopting a generally polymeric shape, for example, triangular, square, pentagonal or hexagonal. The sections of the band between the kinks may be straight or curved. In another embodiment two diametrically opposing kinks separated by sections of curved band can form an elliptical band. In other embodiments the plurality of kinks may be non-uniformly spaced about the circumference and/or comprise different shapes. In this regard the skilled man can design the band as desired in order to create the desired retention force and fit with the cooperating component.

As discussed above, the elastomeric rings of the prior art are most often used in the field of dental implantology to connect a tool to a manipulating device, such as a drive tool or adaptor. In such situations the ring is located at the proximal end region of the tool. Therefore in a preferred embodiment of the present invention, the proximal end region of the tool comprises connection means for connection to a manipulating device, said connection means comprising a metal annular resilient retention member.

Preferably the tool shaft comprises an annular groove dimensioned to accommodate the resilient member, such that at least a section of the member protrudes from the surface of the shaft. This enables the member to engage with the manipulating device. The groove may have a depth less than the diameter of the cross-section of the annular member, such that the member protrudes from the surface of the shaft about the full circumference of the member. Alternatively however, when the member comprises one or more protrusion, the groove may be dimensioned such that only these protrusions extend beyond the surface of the shaft. Although a groove is preferred it is possible for the member to be attached to the tool via other means, such as for example welding or bonding. In further embodiments, as discussed above, the member may also be integral with the shaft.

Preferably the groove is continuous such that it extends 360° about the shaft, although in embodiments in which the annular member is discontinuous the groove may also extend only partially about the circumference of the tool.

In general the groove may have any shape as long as this securely holds the resilient member at a fixed axial location on the tool shaft.

Preferably the annular resilient retention member is connected to the external surface of the shaft. This enables the shaft at the proximal end of the tool to be solid and hence increases its strength. In preferred embodiments therefore the groove is located on the exterior of the tool and at least a section of the member protrudes from the external surface of the shaft.

In use the connecting means at the proximal end region of the tool is inserted into a hollow sleeve at the distal end of the manipulating device. The diameter of at least a portion of the sleeve of the manipulating device is less than the maximum diameter of the annular member, such that this is compressed upon insertion into the sleeve. The sleeve may or may not comprise an annular recess into which the member can expand. Depending on the geometry of the sleeve of the manipulating tool the annular member forms a press or snap fit to hold the tool in fixed axial relation to this.

Alternatively however it is also possible for the resilient annular member of the present invention to be connected to the interior of the dental tool. In such embodiments the tool shaft comprises a through hole, or blind bore, preferably comprising an annular groove as described above. The groove is dimensioned such that at least a section of the annular member protrudes beyond the internal surface of the shaft for engagement with the cooperating manipulating device. In alternative embodiments the member can be connected to the internal surface of the shaft by other means, such as bonding or welding, in which case no groove is necessary.

In embodiments in which the annular member is connected to the interior of the shaft, it is the manipulating device which is inserted into the hollow section of the dental tool. The annular member then engages the device to form a press or snap fit in the same manner as discussed above.

In preferred embodiments the connection means of the tool further comprises a torque receiving section for receiving torque from a manipulating device. The annular member is preferably located in close proximity to the torque receiving section, in order to keep the length of the connection means to a minimum. Preferably the resilient annular member is located distal to the torque receiving section. This enables the torque receiving section to be inserted into or over the manipulating device prior to engagement of the annular member with the manipulating device, which assists in the ease of connection of the tool to the manipulating device. Preferably the annular member is located distally adjacent to the torque receiving section.

The torque receiving section preferably has a non-circular cross-section in a plane perpendicular to the longitudinal axis shaped for cooperation with a torque transmitting section of the manipulating device, which also comprises a non-circular cross-section. For example, the torque receiving section may comprise a single planar surface running parallel to the longitudinal axis, or it may comprise a section of the tool shaft which is polygonal, e.g. hexagonal or octagonal, in cross-section. Preferably the torque receiving means is an integral part of the tool shaft. Any known torque receiving section can be used in the tool of the present invention.

In addition or alternatively to the above discussed embodiments, in which the resilient annular member forms a part of the connection means at the proximal end of the tool, the resilient annular member can be located at the distal end of the tool. Therefore, preferably the distal end region of the tool comprises a functional element, said element comprising a metal annular resilient retention member for axially retaining a cooperating component. The member can be attached to the exterior or interior surface of the tool shaft in the same manner as discussed above in relation to the proximal end of the tool.

Therefore, preferably the tool shaft comprises an annular groove dimensioned to accommodate the resilient member, such that at least a section of the member protrudes from the surface of the shaft. This enables the member to engage with the cooperating component. The groove may have a depth less than the diameter of the cross-section of the annular member, such that the member protrudes from the surface of the shaft about the full circumference of the member. Alternatively however, when the annular member comprises one or more protrusion, the groove may be dimensioned such that only these protrusions extend beyond the surface of the shaft. Although a groove is preferred it is possible for the member to be attached to the tool via other means, such as for example welding or bonding. In further embodiments, as discussed above, the member may also be integral with the shaft.

Preferably the groove is continuous, although in embodiments in which the annular member is discontinuous the groove may also extend only partially about the circumference of the tool.

In general the groove may have any shape as long as this securely holds the annular member at a fixed axial location on the tool shaft.

Preferably the resilient annular member is connected to the external surface of the shaft. This enables the shaft at the distal end of the tool to be solid and hence increases its strength. In preferred embodiments therefore the groove is located on the exterior of the tool and at least a section of the member, e.g. the one or more protrusion, protrudes from the external surface of the shaft.

In use the functional element of the tool is inserted into a hollow sleeve or bore at the distal end of the cooperating component. The diameter of at least a portion of the sleeve or bore of the cooperating component is less than the maximum diameter of the annular member, such that this is compressed upon insertion into the cooperating component. The sleeve or bore may or may not comprise an annular recess into which the member can expand. Depending on the geometry of the sleeve or bore the annular member forms a press or snap fit to hold the tool in fixed axial relation to this.

Alternatively however it is also possible for the resilient annular member of the present invention to be connected to the interior of the tool. In such embodiments the tool shaft comprises a through hole, or blind bore, preferably comprising an annular groove as described above. The groove is dimensioned such that at least a section of the member protrudes beyond the internal surface of the shaft for engagement with the cooperating component. In alternative embodiments the member can be connected to the internal surface of the shaft by other means, such as bonding or welding, in which case no groove is necessary.

In embodiments in which the annular member is connected to the interior of the shaft, it is the cooperating component which is inserted into the hollow section of the dental tool. The annular member then engages the device to form a press or snap fit in the same manner as discussed above.

In preferred embodiments the annular member of the functional element is connected to the exterior of the tool shaft, the shaft preferably comprising an annular groove on its exterior surface to house the member such that at least a section the member, e.g. the one or more protrusion, protrudes from the external surface of the shaft.

A resilient metal annular member located on the exterior surface of the functional element of the tool can be used to axially connect the tool to any object comprising a bore, sleeve etc into which the annular member can be inserted. For example, the member can be shaped and dimensioned to engage a dental implant, or a secondary component which in use is connected to the implant, such as an abutment.

The annular resilient retention member of the present invention can, for example, be used in any of the insertion tools or transfer pieces described in the above mentioned patents.

Alternatively an annular member fastened to the interior of the functional element of the tool can be placed over and engage the external surface of an implant or other dental component.

When the annular member is designed for engagement with the internal bore of an implant, or other cooperating component, this can be arranged for insertion into an undercut or recess within the bore, in which case a snap fit is created, or it may simply form a press-fit against a cylindrical section of the internal bore. For example, when the implant bore comprises a threaded portion it is preferable for the resilient annular member to engage and form a press fit with this threaded section. The internal threads assist with creating a good retention between the components and provide a tactile sensation to the user as the member is pushed over the threads.

In a particularly preferred embodiment, the tool comprises a metal annular resilient retention member at its proximal end and a further metal annular resilient retention member at its distal end. This enables the benefits of the present invention to be utilised at both ends of the tool. Preferably the resilient annular members are metal rings.

The dental tool of the present invention can be any tool used in the field of dental implantology. For example, the tool may be a dental drill, comprising at its distal end a drill head. In such embodiments the resilient annular member is usually located in the proximal end region of the tool as part of the connection means for connection to a drive tool, such as a dental handpiece. Alternatively the tool may comprise a mucosa punch, a dental tap, curette etc. In all such cases the resilient annular member is preferably located at the proximal end region of the tool for engagement with a manipulating device, such as a dental handpiece, ratchet, manual gripping handle etc.

In an alternative embodiment the dental tool may comprise an adaptor or extension piece designed to indirectly connect a manipulating device to a further dental tool. Such adaptors can be used for example to enable a wide range of dental tools to be operated by a single manipulation device. Such adaptors must be axially connected to both the manipulating device and the further dental tool, and therefore the metal annular resilient retention members of the present invention can be located at both the proximal and distal ends of the tool.

In a further embodiment the dental tool itself may comprise a manipulating tool. In such embodiments the distal end region of the tool comprises a metal annular resilient retention member for axial retention of the cooperating dental tool.

According to a preferred embodiment, the dental tool comprises an insertion tool, having at its distal end a functional element comprising torque applying means suitable for transmitting torque to a dental implant and axial retention means for axially connecting the implant to the tool. According to one embodiment the annular resilient retention member of the present invention is located in the proximal end region of the insertion tool for engagement with a manipulating device, such as a dental handpiece, ratchet etc. Additionally or alternatively the annular resilient retention member of the present invention is located at the distal end and forms the axial retention means. In a particularly preferred embodiment an annular resilient retention member according to the present invention, preferably a C-ring and preferably comprising at least one kink, is located at the proximal end as well as the distal end of the insertion tool.

The torque applying means can be any known shape capable of transmitting torque to the implant. For example, it can comprise a screw for engagement with the internally threaded implant bore, such as the type disclosed in EP0986341. In such embodiments the torque transmission means also forms the axial connection means. Alternatively the torque transmission means may comprise a conical section for frictional engagement with a conical section of the implant bore. Preferably however the torque transmission means comprises a section of the tool shaft having a non-circular cross-section in a plane perpendicular to the longitudinal axis for non-rotational engagement with a section of the bore having a complementary, but not necessarily matching, non-circular cross-section. In this regard any known torque applying means can be used in the insertion tool of the present invention.

When the insertion tool comprises both proximal and distal annular resilient retention members it is preferable that the cross-sectional diameter of the distal member is smaller than that of the proximal member. This is, in part, due to the small dimensions of most implants. However, additionally the narrower cross-section reduces the strength of the distal member in comparison to the proximal member. The retention force provided by the distal member is therefore less than that of the proximal member and hence the insertion tool will disengage from the implant before it disengages from the manipulating device. This eases handling of the device. In alternative embodiments the relative retention forces of the annular members could be reversed, such that the insertion tool disengages from the manipulating device prior to the implant. Such embodiments are beneficial when the insertion tool is intended to be used with differing manipulation tools while connected to the implant.

Preferably the cross-sectional diameter of the distal annular member is less than 0.3 mm, e.g. 0.2 mm. Preferably the cross-sectional diameter of the proximal annular member is greater than 0.3 mm, e.g. 0.4 mm.

More generally, it is preferable that the pull off force of the distal member is less than that of the proximal member. The "pull off force" is a measure of the force that needs to be applied to the tool to release it from the element to which it is connected, e.g. the implant or manipulating tool.

According to a further aspect the present invention provides a dental implant insertion tool as described herein in combination with a dental implant. The implant comprises an anchoring section for anchoring in the bone. This section usually comprises an external thread. In preferred embodiments the implant comprises an internal bore extending along the longitudinal axis of the implant from the coronal end. The insertion tool can comprise a metal annular resilient retention member at its proximal end and/or its distal end. When the insertion tool comprises a resilient annular member at its distal end for engagement with the implant the implant may comprise an undercut dimensioned to accommodate the member. This undercut can be located within the internal bore (when present) or on the external surface of the implant, for example, the implant may comprise a flaring neck at its coronal end, over which a resilient annular member connected to the interior surface of the insertion tool can be snapped. Alternatively the annular member may be intended to form a press fit with the implant. For example, the resilient annular member may be dimensioned for insertion into the internal bore (when present) of the dental implant and compression against a threaded section of the bore.

In dentistry, the term "coronal" refers to the direction towards the crown of a tooth, as opposed to "apical", which refers to the direction towards the tip(s) of the root(s). In the context of a dental implant or other dental component therefore, the coronal end thus corresponds to the end which—in use—is closest to the crown of the tooth, whereas the apical end corresponds to the end which is facing the tooth root.

As discussed above, in preferred embodiments the annular member(s) of the present invention are resilient metal bands, preferably rings, preferably discontinuous rings having a circumferential gap and preferably comprising at least one kink.

In general, when an annular resilient band is intended for cooperation with a circular, uniform undercut or cylindrical surface of a manipulating device or other cooperating component it is preferable that the band comprises a single kink or other protrusion. When the undercut or cylindrical surface is non-circular however, e.g. octagonal, such that the circumference of the undercut or surface is not uniform, it is preferable that the band comprises a plurality of kinks or other protrusions. This ensures that at least one kink or protrusion is firmly located within the undercut or compressed against the cylindrical surface and hence a good retention is provided.

As used herein, the terms "distal end" and "distal end region" are synonymous and are intended to refer not to the distal most tip of the tool but more generally to this end portion of the tool. The same is true in respect of the terms "proximal end" and "proximal end region".

Unless expressly described to the contrary, each of the preferred features described herein can be used in combination with any and all of the other herein described preferred features.

Preferred embodiments of the invention will now be described, by way of example only, with reference to the accompanying drawings.

FIG. 3 shows a longitudinal cross-section of the insertion tool of FIG. 1 in combination with an implant and drive tool;

FIG. 4 shows a cross-section along the plane A-A shown in FIG. 3;

FIG. 5 shows detail X of FIG. 4;

Figure 1:
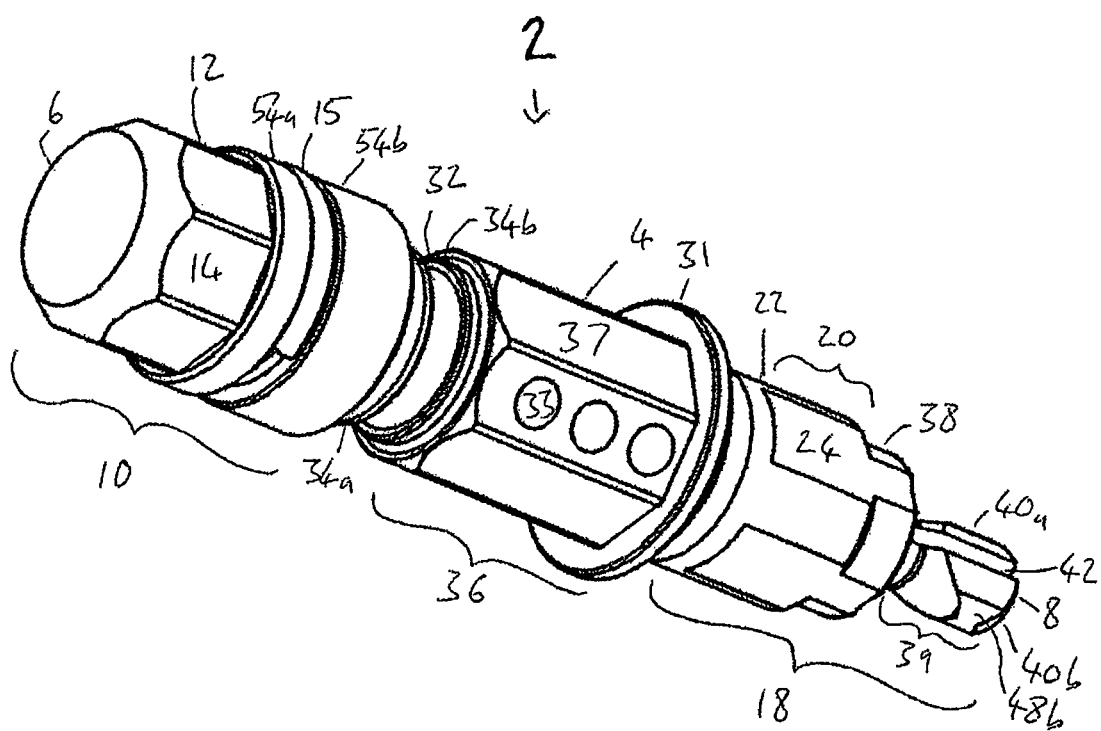
FIG. 1 shows a perspective view of a first embodiment of the present invention.
Figure 2:
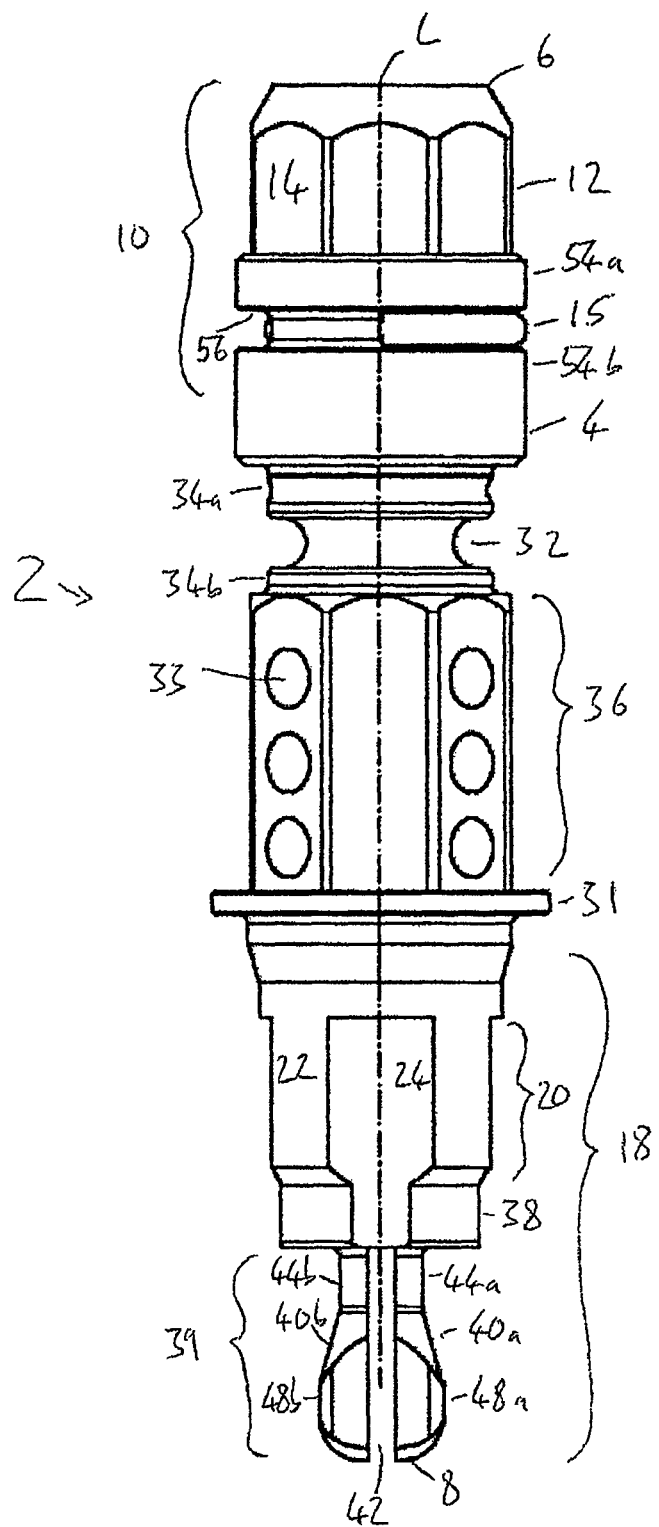
FIG. 2 shows a side view of the embodiment shown in FIG. 1.

As shown in FIGS. 1 and 2, an insertion tool 2 according to the present invention comprises a tool shaft 4 extending along a longitudinal axis L from a proximal end 6 to a distal end 8.

In the region of the proximal end 6, a connection means 10 is formed, which comprises a torque receiving means 12 adapted for receiving torque from a manipulating tool.

In the embodiment shown, the torque receiving means 12 has the form of a polygonal cylinder, more specifically of an octagonal cylinder. The torque receiving means 12 thus has an external lateral surface having eight flat areas angularly spaced about the longitudinal axis L, each of them forming a torque receiving surface 14. As can be seen, the corners of the octagon are rounded off to prevent sharp edges.

The connection means 10 of the insertion tool 2 further comprises a resilient C-ring 15 made of TAN. In order to hold the ring 15 in place, the tool shaft comprises an annular groove 56 on its external surface. The TAN ring 15 is positioned in the annular groove 56 and is thus sandwiched between and held in place by clamping sections 54a, 54b.

At least a section of the outer diameter of ring 15 protrudes from the outer diameter of the clamping sections 54a, 54b. The surface of the protruding section of the ring allows a friction-fit or snap fit to be established with the internal surface of the sleeve of a manipulating device.

At the distal end 8 of insertion tool 2, a functional element 18 is formed which comprises a torque applying means 20 adapted for applying torque—received by the insertion tool at the torque receiving means 12—to the dental implant.

In the embodiment shown, the torque applying means 20 is a non-circular cylindrical section, the lateral surface 22 of which having four longitudinal grooves 24 angularly spaced around the longitudinal axis L by 90°. Each groove 24 is curved over a radius, such that the cross-section of the grooves in the direction perpendicular to the longitudinal axis L is arc-shaped. The curved surface of each groove 24 forms a torque applying surface.

Between the connection means 10 and the functional element 18, the tool shaft 4 comprises a break zone 32, which is designed to break above a predetermined amount of torque $T_{break}$. In the embodiment shown, the break zone 32 is a narrow section of reduced diameter arranged between two cylindrical sections 34a, 34b of a larger diameter. Break zone 32 forms the narrowest part of the insertion tool 2.

Between the torque applying means 20 and the break zone 32, the tool shaft 4 comprises an auxiliary torque receiving means which is also adapted for receiving torque from a manipulating device. In the embodiment shown, the cross-sectional contour of the auxiliary torque receiving means 36 is substantially identical to the primary torque receiving means 12 as both torque receiving means 12, 36 have the basic form of a regular polygonal cylinder and have an identical octagonal basic area shape. The external lateral surface of the auxiliary torque receiving means 36 therefore provides eight flat areas angularly spaced about the longitudinal axis L, each of them forming a torque receiving surface 37.

The orientation holes 33 which are located on every second auxiliary torque receiving surface 37 indicate to the user the orientation of the anti-rotation surfaces of the attached implant. Thus, the surgeon can insert the implant into the bone at a desired angular orientation.

Directly apically adjacent to the torque applying means 20, an extension section 38 in the form of a circular cylinder of reduced diameter is formed. From this, axial retention means 39, comprising two identically formed longitudinal dental implant retention arms 40a, 40b, extends. The dental implant retention arms 40a, 40b are separated from each other by a longitudinal slit 42 having an axis coinciding with the longitudinal axis L of the insertion tool 2; they are thus arranged symmetrically about the longitudinal axis L of the insertion tool 2.

In the longitudinal direction, a first portion 44a, 44b of both dental implant retention arms 40a, 40b, which are directly adjacent to the extension section 38, form stems. Due to the thinness of the first portions 44a, 44b, they are resiliently deflectable towards the longitudinal axis L of the insertion tool.

Apical of the first portions 44a, 44b the outer diameter of the dental implant retention arms 40a, 40b, increases and forms a bulge 48a, 48b.

In use, the insertion tool 2 is brought into engagement with a dental implant 100 by inserting the functional element 18 into the implant bore 101, as shown in FIG. 3. The resilient dental implant retention arms 40a, 40b are thereby compressed inwardly and thus deflected towards the longitudinal axis L. Since the outer radius of the bulges 48a, b is greater than the radius of the implant bore 101 at the axial location at which the bulges 48a, b are located, the dental implant retention arms 40a, 40b try to return to their rest position and thereby contact and press outwardly against the internal wall of the implant bore 101, which creates a press or interference fit between the dental implant 100 and the insertion tool 2. Thus, the dental implant 100 is releasably axially held by the insertion tool 2 and accidental disconnection of the two components is prevented.

In the present embodiment the insertion tool 2 is prevented from being inserted too deeply into the implant bore 101 by shoulder 31, which in use abuts against the coronal end 104 of the implant 100.

When the insertion tool 2 is inserted into the implant bore 101, the two components are fixed anti-rotationally, which ultimately allows torque to be transmitted to the dental implant. To this end, the implant bore 101 comprises an anti-rotation means 102 having four radially inwardly protruding projections 103, each providing anti-rotation surfaces complementary to the respective torque applying surfaces of the torque applying means 20.

This can be seen most clearly in FIG. 4, which shows a cross-section through the aligned anti-rotation means 102 and torque applying means 20. Each of the projections 103 contacts a groove 24 of the torque applying means 20. When the insertion tool 2 is rotated in the direction indicated in FIG. 4 the surface of the grooves 24 is brought into contact with the protrusions 103 as shown in detail in FIG. 5. This contact occurs in the same area of each groove and protrusion, thus providing an evenly distributed transmission of torque. As can be seen in FIG. 5, minimal surface contact is achieved between the groove 24 and protrusion 103, thus reducing the possibility for jamming.

For applying torque to the insertion tool 2, the primary torque receiving means 12 is brought into engagement with a manipulating device 200.

The manipulating device 200 has at its distal end a hollow sleeve 201 into which the connection means 10 of the insertion tool 2 can be inserted. Flat surface areas on the interior surface of sleeve 201 form torque transmitting surfaces 202. In the present embodiment these surfaces form an octagonal cross-section matching the torque receiving surfaces 14 of the insertion tool 2. When engaged, the torque transmitting surfaces 202 of the manipulating device 200 and the torque receiving surfaces 14 of the insertion tool 2 are in non-rotational alignment with each other, thus providing for torque transmission between the components.

Distal of the torque transmitting surfaces 202, sleeve 201 comprises an annular groove 205. This recess is dimensioned to have a diameter greater than the diameter of TAN ring 15. Distal of the groove 205, at the distal end of the sleeve 201, the walls form a constriction 206. The diameter of the sleeve at this constriction 206 is approximately equal to the diameter of clamping sections 54a, b of shaft 4. As the ring has at least one section which protrudes beyond clamping sections 54a, b this must distort as it passes through constriction 206. Once the ring 15 is moved into alignment with the groove 205 this can return to its rest position. This "springing" or "snapping" back into its original shape informs the user that connection to the manipulating device 200 has been achieved. Furthermore, in order to move ring 15 back through constriction 206 force is required to again compress the ring 15. Therefore, until this force is supplied, ring 15 holds the insertion tool 2 in axial engagement with the manipulating device 200.

For inserting the dental implant into the implantation site, torque is applied from the manipulating device 200 to the insertion tool 2 which transmits torque to the dental implant 100. Torque can be applied to the manipulating device 200 via the human hand gripping handle 203. Handle 203 comprises angularly spaced longitudinal grooves 204, which can alternatively be engaged by a suitably shaped wrench or ratchet.

Figure 6:
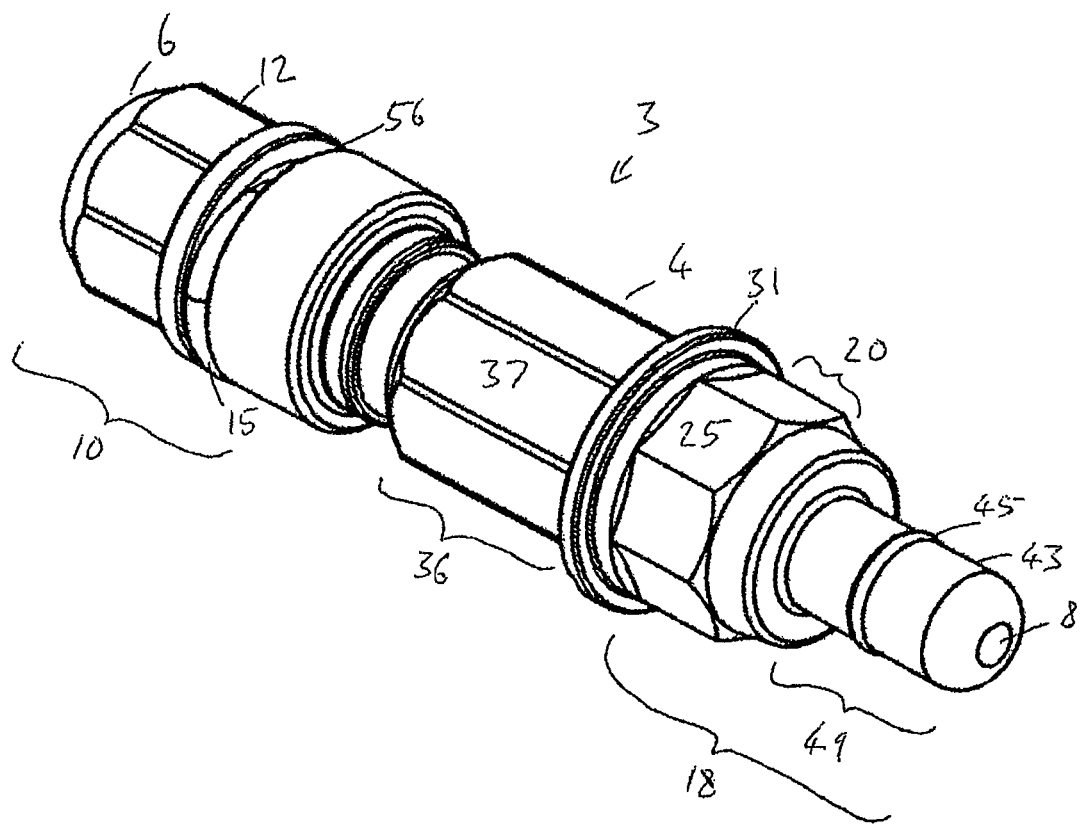
FIG. 6 shows a perspective view of a second embodiment of the present invention.
Figure 7:
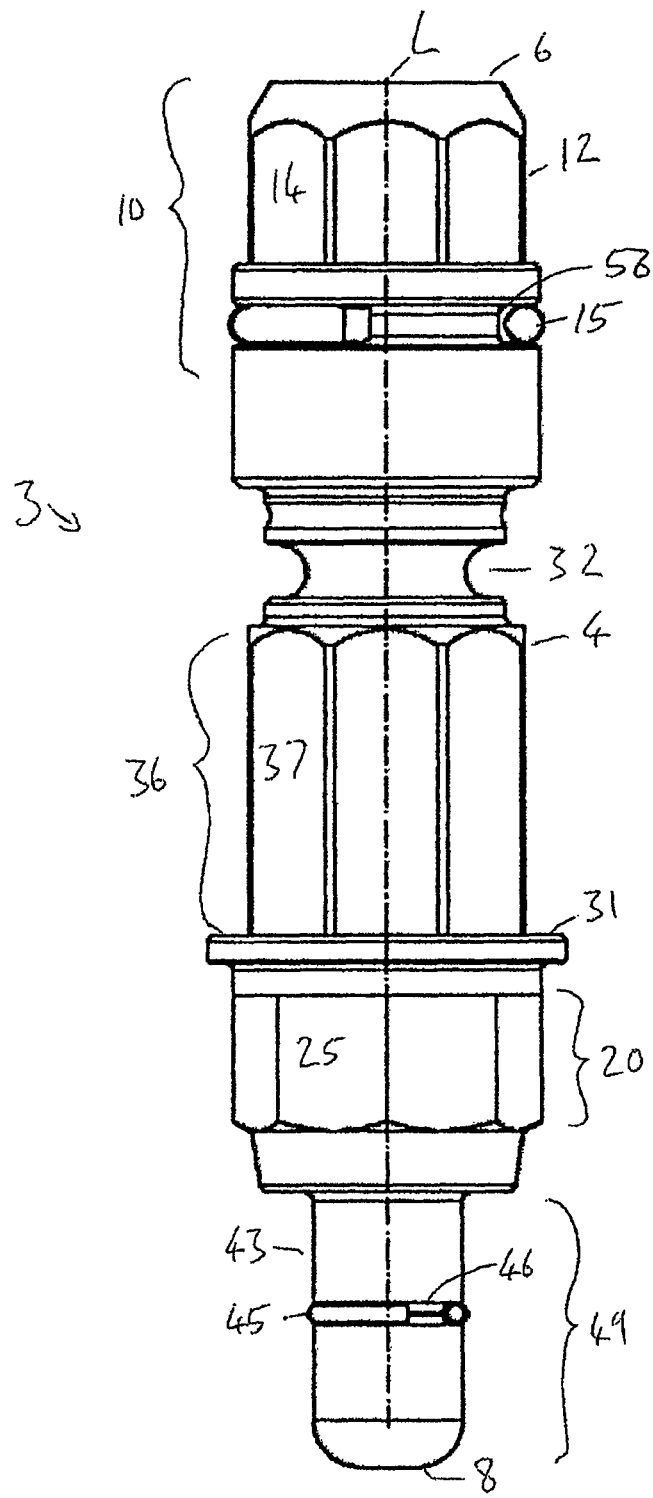
FIG. 7 shows a side view of the embodiment shown in FIG. 6.

FIGS. 6 and 7 show an alternative insertion tool 3 according to the present invention which differs from the embodiment shown in FIG. 1 mainly in the design of the functional element 18. Where appropriate the same reference numerals are used for each embodiment.

The connection means 10 is substantially identical to that of the first embodiment, in particular in the provision of a TAN resilient retention C-ring 15 located within an annular groove 56 on the exterior of the tool shaft 4.

At the distal end 8 of the tool 3, the axial retention means 39 of the first embodiment has been replaced by axial retention means 49, which consists of a circular cylindrical section 43 having an annular groove 46 on its exterior surface. The groove 46 is sized to accommodate resilient TAN C-ring 45. The depth of groove 46 is less than the cross-sectional diameter of ring 45, such that this protrudes beyond the groove 46 and the surface of the cylinder 43.

Torque applying means 20 is formed by a section having a generally octagonal cross-section, thus it comprises eight angularly spaced torque applying surfaces 25. Each surface 25 is curved over a radius, such that the cross-section of the each surface in the direction perpendicular to the longitudinal axis L is arc-shaped. In other embodiments however the surfaces 25 may be planar.

The difference in the shape of the toque applying means 20 enables the insertion tool 3 to be used with a different implant.

Figure 8:
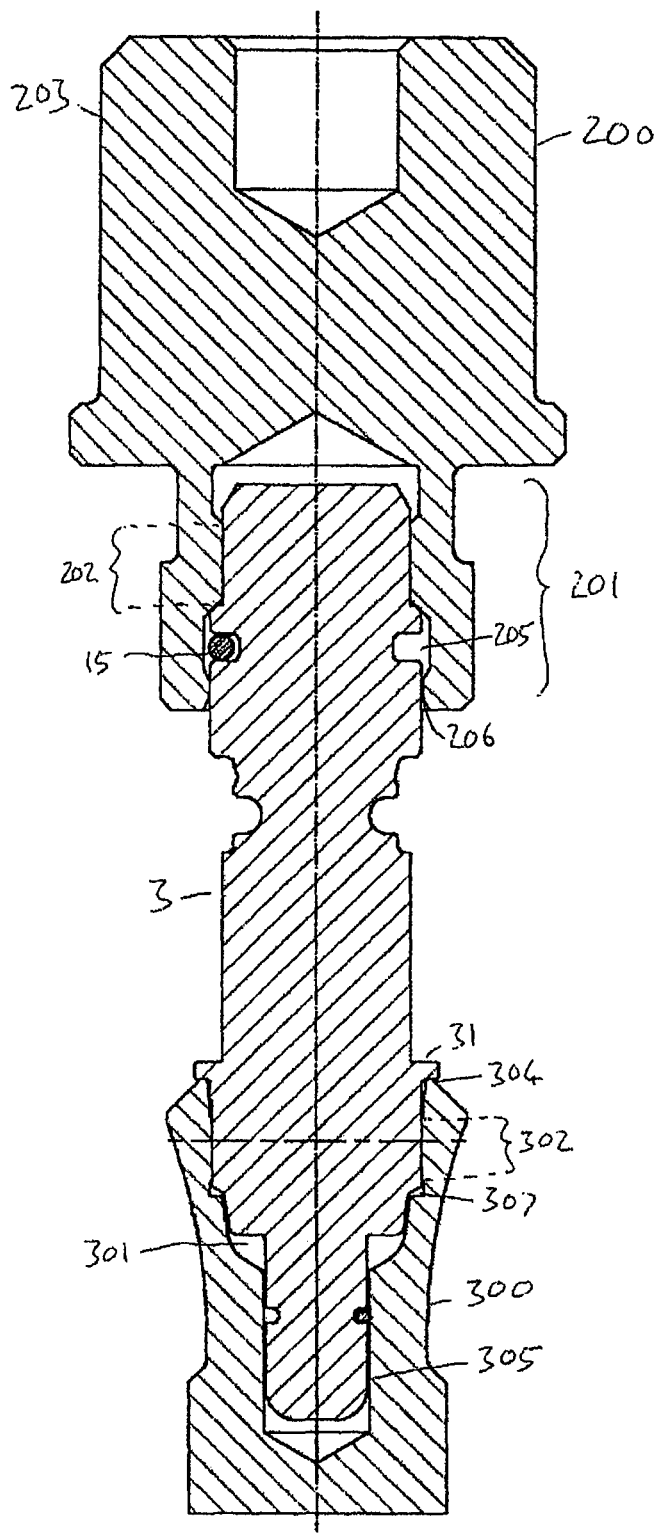
FIG. 8 shows a longitudinal cross-section of the insertion tool of FIG. 6 in combination with an implant and a drive tool.

FIG. 8 shows the insertion tool 3 of FIG. 6 in combination with a dental implant 300 and the same manipulating device 200 as shown in FIG. 3.

Dental implant 300 is similar to dental implant 100 except that the anti-rotation means 302 has an octagonal cross-section. The torque applying means 20 can thus engage with this in a non-rotational manner to transmit torque to the implant 300.

Cylindrical section 43 has a diameter substantially equal to distal end 305 of implant bore 301, which may or may not be threaded. As discussed above, ring 45 protrudes beyond the outer surface of cylindrical section 43 and so, upon insertion into distal end 305, ring 45 is compressed. The force exerted by ring 45 on the walls of distal section 305, as the ring 45 attempts to revert to its rest shape, creates a press fit, otherwise known as a friction or interference fit, thus axially retaining the insertion tool 3 within the implant 300.

In the present embodiment the insertion tool 3 is prevented from being inserted too deeply into the implant bore 301 by shoulder 31, which in use abuts against the coronal end 304 of the implant 300, although such an abutment surface is not necessary.

At the opposing end of insertion tool 3, resilient ring 15 operates as described above in relation to FIG. 3 in order to create a snap-fit connection to the manipulating device 200. Resilient ring 15 is designed to have a greater pull off force than ring 45, such that after the implant has been inserted into the jawbone and force is applied to the insertion tool in a direction away from the implant, the insertion tool disengages first from the implant. This eases the handling of the system as both the insertion tool 3 and manipulating device 200 can be removed from the implantation site in one action.

In an alternative to the embodiment shown in FIG. 8, a resilient metal retention ring can be positioned and dimensioned to fit within an undercut within implant 300, thus creating a snap fit between the insertion tool 3 and implant 300.

Figure 9:
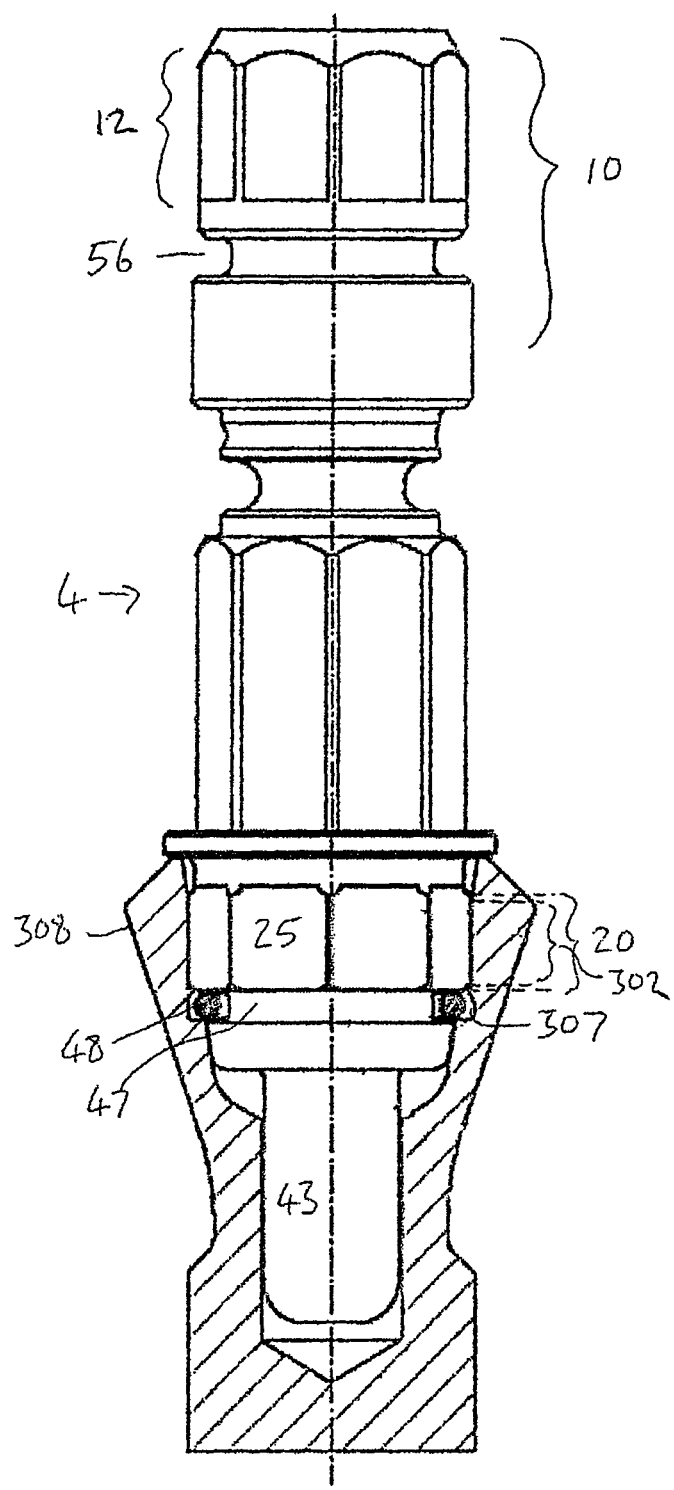
FIG. 9 shows a longitudinal cross-section of a third embodiment of an insertion tool in accordance with the present invention in combination with an implant.

This is shown in FIG. 9, in which the same reference numerals are used where appropriate.

Insertion tool 4 is identical to insertion tool 3 of FIGS. 6-8 with the exception that cylindrical section 43 does not comprise a groove. Instead, an annular groove 47 is located directly apical of the torque applying means 20. A resilient metal C-ring 48 is accommodated within this groove 47 such that at least a section of the ring 48 protrudes beyond the groove 47.

Implant 300 comprises, directly apical of the anti-rotation means 302, an undercut 307 having a greater diameter than the anti-rotation means 302. As the functional end of the insertion tool is inserted into the implant bore 301, ring 48 is compressed until it is brought into alignment with the undercut 307. At this point the ring is able to return to its rest position, causing a "snap" sensation which is felt by the user. This informs the user that the correct axial alignment between the insertion tool 4 and the implant 300 has been achieved and further the positioning of the ring 48 in the undercut 307 axially holds the implant 300 on the insertion tool 4.

Figure 10:
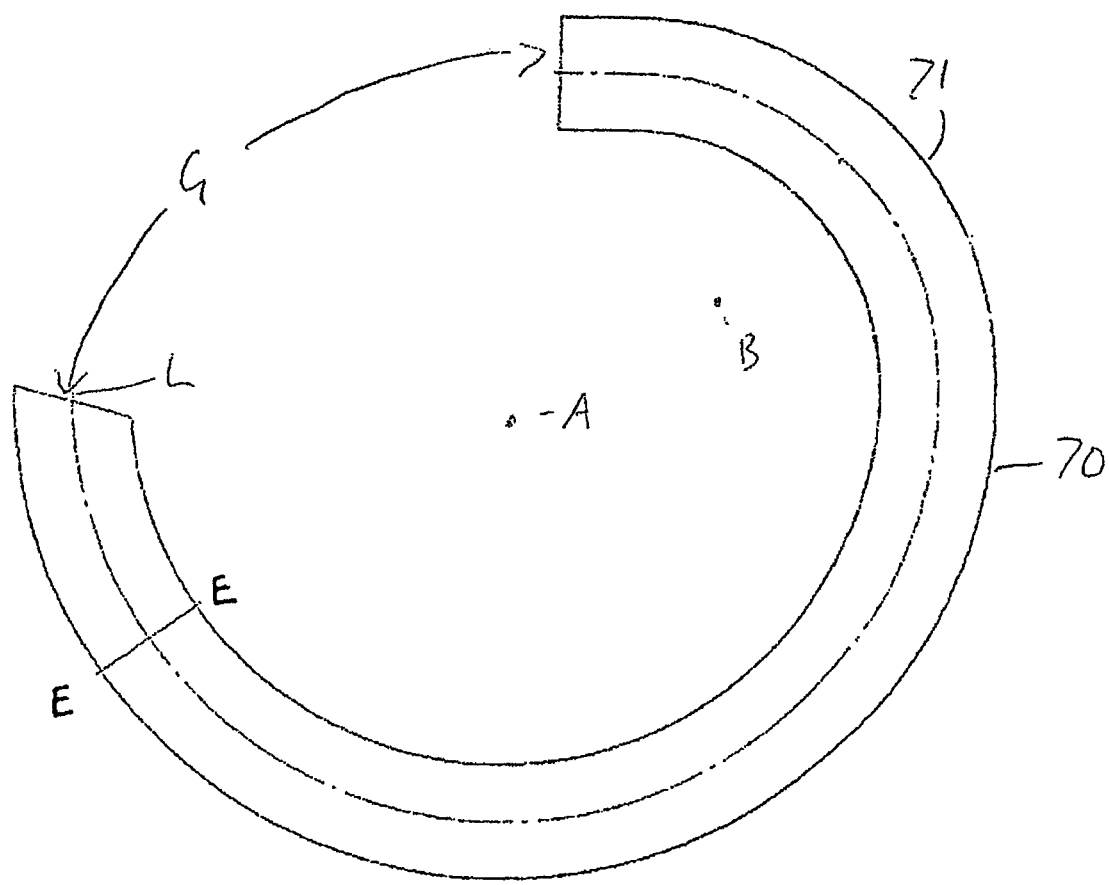
FIG. 10 shows a resilient retention ring according to the present invention in isolation.

FIG. 10 shows a plan view of a resilient retention ring 70 of the present invention in isolation. Such a ring could be used in any of the above discussed embodiments at either the distal or proximal end of the tool.

Ring 70 is a C-ring and has a circumferential gap G. This enables the ring 70 to compress and provides a spring force to bias this towards its rest shape (which is shown in FIG. 10). Gap G extends over an angle of approximately 90°.

As can be seen in FIG. 10, ring 70 does not follow a circular path about central axis A but instead comprises a kink 71. This kink is formed by a section of ring 70 which is bent around an axis B remote from the central axis A at a smaller radius of curvature than the remaining ring section. As a result the kink 71 forms a protrusion, that is, it extends further from the central axis A than the remainder of the ring. In addition, the kink 71 acts as a lever arm which increases the retentive force provided by the ring 70.

If desired further kinks could be added to the ring 70, although in general, in situations in which the ring is intended for cooperation with a circular recess or wall, a single kink is preferred for simplicity.

Figure 10A:
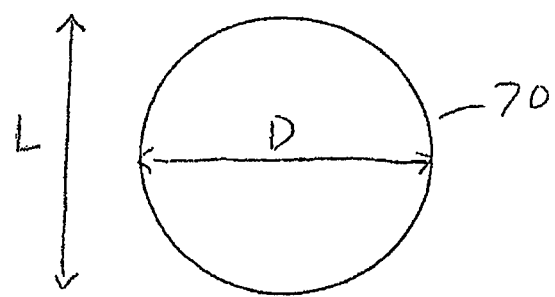
FIG. 10A shows a cross-section along line E-E of FIG. 10.

The cross-section of ring 70 in a plane perpendicular to longitudinal axis L of the ring 70 is shown in FIG. 10A. The ring has a circular cross-section, although other cross-sections are possible. The diameter D of the ring 70 is equal to its longitudinal length L. When the longitudinal length L is more than twice as large as the diameter D the annular resilient member is considered to be a sleeve. Such sleeves may also comprise kinks of the type shown in FIG. 10, however they may also comprise protrusions located only at a certain longitudinal location of the sleeve, e.g. a circumferential bulge may run about the middle of the sleeve.

Returning to FIG. 10A, the diameter D of ring 70 can be larger than the groove 56, 46, 47 in which, in use, the ring 70 is housed. This enables the ring 70 to form a press or snap fit with a cooperating component. Alternatively only the kink 71 or kinks, where present, may be shaped to protrude from the groove 56, 46, 47, such that there is only a predetermined number of points of contact. For example, when a single kink is used there will be only one point of contact between the ring 70 and the co-operating device, e.g. manipulating tool, implant etc.

Figure 11:
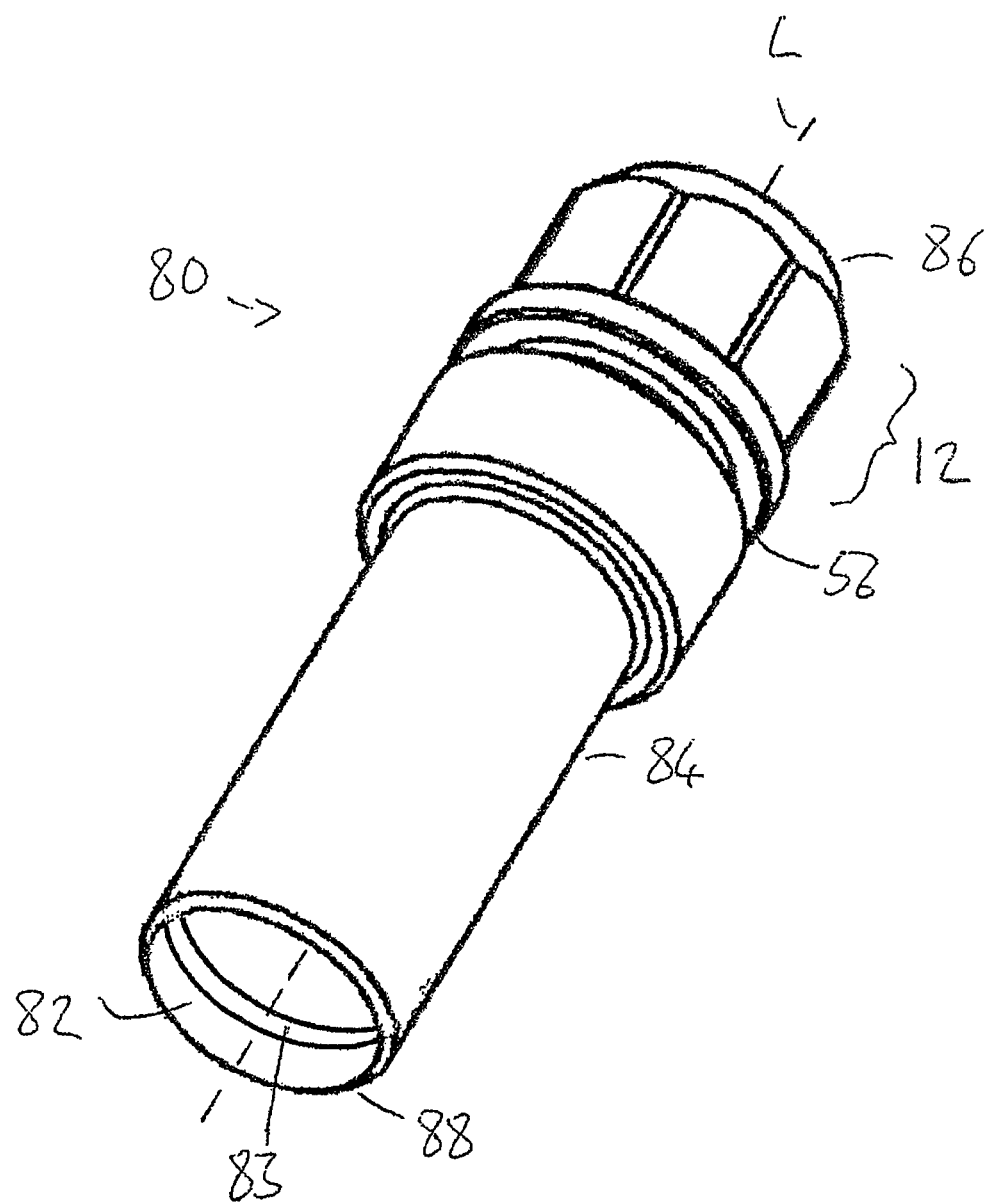
FIG. 11 shows a perspective view of a fourth embodiment of the present invention.

The previous three embodiments show examples of dental tools in which the resilient rings of the present invention are attached to the exterior of the shaft. FIG. 11 shows a basic representation of a tool in which the ring is located on the interior of the tool.

Dental tool 80 comprises a shaft 84 extending along longitudinal axis L from a proximal end 86 to a distal end 88. The tool is hollow at its distal end 88, creating a sleeve 82. The interior wall of sleeve 82 comprises an annular groove 83, which is dimensioned to house a resilient metal ring, such as that shown in FIG. 10. The groove 83 has a depth dimensioned such that the at least a portion of the ring protrudes from the interior surface of the sleeve 82. In this way, the ring can form a press or snap fit with the external surface of a device or component over which the sleeve 82 is placed. For example, the sleeve may be dimensioned to fit over the coronal end of implant 300 such that a ring housed within groove 83 can form a snap-fit connection to the external undercut 308 formed by the flared neck portion of the implant.

The proximal end 86 of the tool 80 comprises a torque receiving means 12 and groove 56 of the type described in detail in relation to FIGS. 1 and 2. A resilient metal ring housed in groove 56 can thus be used to axially attach the tool 80 to a manipulating device. Of course, it is also possible that the proximal end 86 of the tool 80 comprises a hollow sleeve with an internal resilient ring. The shape and positioning of the ring at either end will depend on the type and shape of the device to which it is intended to fasten the tool 80.

The above described embodiments are for illustrative purposes only and the skilled man will realize that many alternative arrangements are possible which fall within the scope of the claims. In particular, the resilient ring could be replaced by another form of resilient annular member such as a sleeve or integral section of the tool shaft. The ring could be made from any suitable flexible, biocompatible metal, such as titanium or steel. The dental tool can be any known dental tool which currently comprises an elastomeric retention ring, such as a dental drill or other surgical tool.

Where technical features mentioned in any claim are followed by reference signs, those reference signs have been included for the sole purpose of increasing intelligibility of the claims and accordingly, such reference signs do not have any limiting effect on the scope of each element identified by way of example by such reference signs.

The invention claimed is:

1. A dental tool comprising
a shaft extending along a longitudinal axis and having a distal end and a proximal end, and
a connection means positioned at the proximal end of the shaft, the connection means comprising:
an annular resilient retention member formed of a metal material and connected to said shaft such that at least a section of the member protrudes from a surface of said shaft, and
a torque receiving section for receiving torque from a manipulating device, wherein:
the annular resilient retention member is configured to engage an internal engagement surface of the manipulating device to connect the dental tool to the manipulating device,
the annular resilient retention member is a hollow band comprising at least one kink,
the hollow band has a central axis, and the kink is formed by a section of the band that is bent around an axis remote from the central axis at a smaller radius of curvature than a remainder of the hollow band, and
the hollow band has substantially the same cross-sectional diameter along a length thereof.

2. The dental tool as claimed in claim 1, wherein the annular resilient retention member is formed from titanium or a titanium alloy.

3. The dental tool as claimed in claim 1, wherein the annular resilient retention member is formed of the same material as the dental tool shaft at the location at which the member is connected.

4. The dental tool as claimed in claim 1, wherein the band is discontinuous.

5. The dental tool as claimed in claim 4, wherein the band comprises a circumferential gap.

6. The dental tool as claimed in claim 1, wherein the band comprises a ring.

7. The dental tool as claimed in claim 1, further comprising a functional element in a region of the distal end of the tool, the functional element comprising a further annular resilient retention member formed of a metal material for axially retaining a cooperating component.

8. The dental tool as claimed in claim 1, wherein the shaft comprises an annular groove dimensioned to accommodate the annular resilient retention member.

9. The dental tool as claimed in claim 1, wherein the annular resilient retention member is connected to the external surface of the shaft.

10. The dental tool as claimed in claim 1, further comprising a further annular resilient retention member formed of a metal material at the distal end.

11. The dental tool as claimed in claim 1, wherein the dental tool is an insertion tool including at a distal end thereof a functional element comprising
a torque applying means suitable for transmitting torque to a dental implant, and
a further annular resilient retention member formed of a metal material, the further annular resilient retention member forming an axial retention means for axially connecting the implant to the tool.

12. The dental tool as claimed in claim 1, wherein the dental tool is an insertion tool including at a distal end thereof a functional element comprising
a torque applying means suitable for transmitting torque to a dental implant, and
an axial retention means for axially connecting the implant to the tool.

13. The dental tool as claimed in claim 12, wherein the annular resilient retention member is located in a proximal end region of the insertion tool for engagement with a manipulating device.

14. The dental tool as claimed in claim 1, wherein the annular resilient retention member is configured to engage the internal engagement surface of the manipulating device to establish a snap-fit or friction-fit connection to the manipulating device.

15. The dental tool according to claim 1, wherein the shaft further includes a break zone that is located between the distal end and the proximal end and is adapted to break above a predetermined amount of torque.

16. The dental tool according to claim 15, wherein the annular resilient retention member is connected to the shaft proximally of the break zone so as to not overlap the break zone.

17. A combination comprising:
a dental tool; and
a manipulating device;
wherein:
the dental tool comprises a shaft extending along a longitudinal axis and having a distal end and a proximal end,
a proximal end region of the tool comprises a connection means for connecting the dental tool to the manipulating device,
said connection means comprises:
an annular resilient retention member formed of a metal material and connected to said shaft such that at least a section of the member protrudes from a surface of the shaft; and
a torque receiving section for receiving torque from the manipulating device;
the manipulating device comprises an engagement surface;
the annular resilient retention member engages the engagement surface of the manipulating device during use of the manipulating device to axially hold the dental tool on the manipulating device;
the annular resilient retention member is a hollow band comprising at least one kink;
the hollow band has a central axis, and the kink is formed by a section of the band that is bent around an axis remote from the central axis at a smaller radius of curvature than a remainder of the hollow band; and
the hollow band has substantially the same cross-sectional diameter along a length thereof.

18. The combination as claimed in claim 17, wherein a snap-fit or friction-fit connection is established between the annular resilient retention member and the engagement surface of the manipulating device during use of the manipulating device to axially hold the dental tool on the manipulating device.

19. The combination according to claim 17, wherein the shaft further includes a break zone located between the distal end and the proximal end.

20. The combination according to claim 19, wherein the annular resilient retention member is connected to the shaft at a position that does not overlap the break zone.

* * * * *